(12) United States Patent
Sako

(10) Patent No.: US 7,065,031 B2
(45) Date of Patent: Jun. 20, 2006

(54) AUDIO SIGNAL RECORDING MEDIUM AND RECORDING AND REPRODUCING APPARATUS FOR RECORDING MEDIUM

(75) Inventor: Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/863,904

(22) Filed: Jun. 8, 2004

(65) Prior Publication Data

US 2004/0218492 A1 Nov. 4, 2004

Related U.S. Application Data

(62) Division of application No. 09/807,635, filed as application No. PCT/JP00/05483 on Aug. 16, 2000, now Pat. No. 6,954,412.

(30) Foreign Application Priority Data

Aug. 18, 1999 (JP) .............................. P11-232051

(51) Int. Cl.
G11B 7/00 (2006.01)

(52) U.S. Cl. .................................. 369/94; 369/124.05
(58) Field of Classification Search ............. 369/59.21, 369/59.25, 59.27, 124.05, 53.2, 94
See application file for complete search history.

(56) References Cited

U.S. PATENT DOCUMENTS 6,298,025 B1 * 10/2001 McPherson et al. ..... 369/59.21
6,636,474 B1 * 10/2003 Tanaka et al. ........... 369/275.3

* cited by examiner

*Primary Examiner*—Nabil Hindi
(74) *Attorney, Agent, or Firm*—Lerner, David, Littenberg, Krumholz & Mentlik, LLP

(57) ABSTRACT

A recording medium for a disc etc. according to the present invention comprises at least a first recording region in which a first portion of audio signals supplied is recorded and a second recording region in which a second portion of audio signals supplied is recorded. The first and second portions of the audio signals recorded in the first and second recording regions are synthesized and reproduced or selected and reproduced to realize variegated audio reproduction.

13 Claims, 6 Drawing Sheets

AUDIO SIGNAL RECORDING MEDIUM AND RECORDING AND REPRODUCING APPARATUS FOR RECORDING MEDIUM

CROSS-REFERENCE TO RELATED APPLICATIONS

This application is a divisional application of application Ser. No. 09/807,635 filed Apr. 16, 2001 now U.S. Pat. No. 6,954,412, the disclosure of which is hereby incorporated by reference herein. application Ser. No. 09/807,635 is a National Phase entry under 35 U.S.C. § 371 of International Application No. PCT/JP00/05483 filed Aug. 16, 2000, published in Japanese, which claims priority from Japanese Application No. 11-232051 filed Aug. 1, 1999.

TECHNICAL FIELD

This invention relates to a recording medium, a recording apparatus for the recording medium, a reproducing apparatus for the recording medium, a recording method for audio signals and a reproducing method for audio signals. More particularly, it relates to a recording medium on which to record audio signals, a recording apparatus for the recording medium, a reproducing apparatus for the recording medium, a recording method for audio signals and to a reproducing method for audio signals.

BACKGROUND ART

On a compact disc, referred to below simply as CD, which is a standardized optical disc with a diameter of 12 cm, there are recorded audio signals, as digital data converted from analog audio signals.

On a routine CD, there is recorded a musical number as a set of audio data making up the musical number. For example, if a musical number is made up of a lyric and the accompaniment music for this lyric, the lyric and the accompaniment music are recorded as one as a set of audio data.

In an orchestra performed by plural sorts of musical instruments, the performance by the plural sorts of musical instruments is recorded as one as a set of audio data.

In a disc on which the lyric and the accompaniment music therefor have been recorded as one as a set of audio data, it is not possible to select and reproduce only the lyric or the accompaniment music, such that, when only the accompaniment music of a musical number is to be reproduced, the accompaniment music needs to be recorded independently of audio data containing the lyric and the accompaniment music.

Even in case of a disc having recorded thereon as one the performance by the plural sorts of musical instruments as a set of audio data, it is not possible to reproduce the performance by only a certain musical instrument forming an orchestra, such as a piano.

DISCLOSURE OF THE INVENTION

It is therefore an object-of the present invention to provide a recording medium whereby it is possible not only to reproduce a musical number made up of a lyric and the accompaniment music or the orchestra performed by plural sorts of musical instruments as a set of audio signals, but also to reproduce only the accompaniment music of a musical number made up of the lyric and the accompaniment music or only the performance by certain musical instrument(s) of the orchestra.

It is another object of the present invention to provide a recording method and apparatus whereby it is possible to record readily the audio signals recorded on a recording medium which enables recording of a set of audio signals in their entirety or only a portion of the lyric or the accompaniment music of the set of audio signals.

It is yet another object of the present invention to provide a reproducing method and apparatus whereby it is possible to select and reproduce readily the audio signals recorded on a recording medium which enables recording of a set of audio signals in their entirety or only a portion of the lyric or the accompaniment music of the set of audio signals.

A recording medium proposed for accomplishing the above objects, according to the present invention, at least includes a first recording region for recording a first portion of supplied audio signals, and a second recording region for recording a second portion of supplied audio signals. The first and second portions of the audio signals, recorded on the first and second recording regions, respectively, are synthesized and reproduced or selected and reproduced.

The recording medium according to the present invention includes n recording regions in which sampled data generated on sampling audio signals from a sound source with a sampling frequency of 44.1 kHz are recorded from one of n partial portions to another, with each partial portion being recorded in each recording region.

According to the present invention, in reproducing audio signals from a recording medium on which audio signals from a sound source are sampled by a pre-set sampling frequency to generate sampled data which sampled data are separated into n partial portions, at least one of which is the entire sampled data, signals are read out from the n recording regions of the recording medium, and the read-out signals of the respective recording regions of the n recording regions of the recording medium are selectively reproduced. Alternatively, the data recorded in at least two of the entire recording regions are synthesized and reproduced.

Moreover, according to the present invention, in reproducing a recording medium having a first recording region in which a first portion of audio signals supplied is recorded and a second recording region in which a second portion of audio signals supplied is recorded, there being recorded on the recording medium a discrimination signal indicating whether the first and second portions are to be output on addition or on substation, the first portion read out from the first recording region and the second portion read out from the second recording region is reproduced based on the contents of the discrimination signal read out from the recording medium.

Other objects, features and advantages of the present invention will become more apparent from the following detailed description of the present invention and the claims.

BEST MODE FOR CARRYING OUT THE INVENTION

Figure 1:
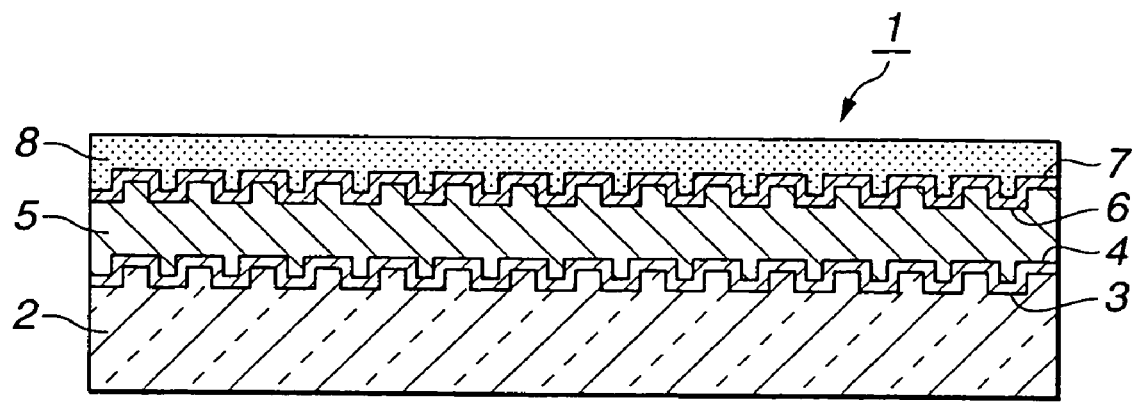
FIG. 1 is a cross-sectional view showing an embodiment of an optical disc embodying the present invention.

Referring to the drawings, a recording medium, a recording apparatus and a reproducing apparatus according to the present invention will be explained in detail.

A recording medium according to the present invention is comprised of an optical disc 1, which is provided with a substrate 2 of a light-transmitting synthetic resin, such as polycarbonate resin, or glass, as shown in FIG. 1. On one surface of the substrate 2, there is provided a pit pattern 3 which is a pattern of micro-sized crests and grooves corresponding to recorded audio data. If the substrate 2 is molded from synthetic resin, this pit pattern 3 is formed simultaneously with the molding of the substrate 2 by a stamper mounted on an injection molding system in injection molding the substrate 2. If the substrate 2 is formed of glass, it is molded using a 2P (PhotoPolymerization) method. In this 2P method, a photo-curable resin, such as UV light curable resin, is charged between a glass substrate and a stamper, and the light, such as UV light is illuminated from the side glass substrate to cure the pattern of the crests and grooves of the stamper in order to transcribe the pattern of the crests and grooves of the stamper to the layer of the photo-curable resin.

The substrate 2, used in this optical disc 1, is obtained on injection molding a polycarbonate resin. On one surface of the substrate 2 is formed audio data as pit pattern 3. Similarly to the substrate of the so-called routine Compact Disc (CD), the substrate 2 is of a diameter of 12 cm and a thickness of approximately 1.2 mm.

On one surface of the substrate 2, carrying the pit pattern 3, there is formed a first recording layer 4 for overlying the pit pattern 3, as shown in FIG. 1. This first recording layer 4 is formed as a semi-transparent film for transmitting a pre-set portion of a light beam radiated from the side substrate and for reflecting a pre-set portion thereof, and is formed as a film of silicon-based material, such as $Si_3N_4$ and $SiO_2$ to a thickness of 100 to 500 nm. The first recording layer 4 is formed as a multi-layer of $Si_3N_4$ and $SiO_2$. The layers of $Si_3N_4$ and $SiO_2$, making up the first recording layer 4, are formed on one surface of the substrate 2 by vacuum deposition or sputtering.

On the first recording layer 4 is formed a second recording layer 6 via an intermediate layer 5 formed e.g., of a light-transmitting UV light curable resin. The intermediate layer 5 is formed to a pre-set thickness because the intermediate layer 5 performs the role of optically separating the first recording layer 4 and the second recording layer 6 from each other so that these recording layers 4, 6 will not be positioned within the depth of focus of an objective lens which is adapted for converging the light beam to these recording layers 4, 6 to illuminate the recording layers. Specifically, the intermediate layer 5 is formed to a thickness on the order of 30 μm. The intermediate layer 5, if too thin in thickness, is unable to separate the reflected light from the first recording layer 4 sufficiently from the reflected light from the recording layer 6, to render it difficult to detect the reflected light beams sufficiently. If conversely the intermediate layer 5 is too thin, spherical aberration, for example, is produced by the intermediate layer 5. Accordingly, the intermediate layer 5 is set to an appropriate thickness taking these points into consideration.

It is noted that the intermediate layer 5 is formed by coating a UV light curable resin on the first recording layer 4 by a spin coating method and subsequently illuminating the UV light for curing. Alternatively, the intermediate layer 5 may be formed on depositing the UV light curable resin layers, each being of a thickness of 5 to 10 μm, a plurality of numbers of times. Still alternatively, the intermediate layer 5 may be formed by bonding a transparent sheet on the first recording layer 4.

On one surface of the intermediate layer 5 is formed a pit pattern 7, which is a pattern of micro-sized crests and grooves corresponding to audio data. This pit pattern 7 may also be formed by the above-mentioned 2P method which is used in forming a pit pattern on a glass substrate using the photo-curable resin, as described above.

The second recording layer 6 is formed to overlie the pit pattern 7 formed on one surface of the intermediate layer 5 in superposition on the first recording layer 4. The second recording layer 6 is formed of a material exhibiting high reflectance, such as aluminum (Al), gold (Au) or silver (Ag) on the intermediate layer 5 with the pit pattern 7, in order to reflect the light beam transmitted through the first recording layer 4 and radiated therefrom with high efficiency onto an optical pickup mounted facing the substrate 2 to output a light beam. On the second recording layer 6 is formed a protective layer 8 formed e.g., of a UV light curable resin to protect the second recording layer 6. This protective layer 8 is formed by coating a UV light curable resin on the second recording layer 6 by a spin coating method and illuminating the UV light thereon to cure the UV light curable resin.

On this first recording layer 4, there are recorded audio data corresponding to the accompaniment music separated from a complete musical number composed of the lyric and the accompaniment music of this lyric, as partial audio data, whereas, on the second recording layer 6, there are recorded audio data corresponding to the entire complete musical number composed of the lyric and the accompaniment music of this lyric.

The audio data may be recorded in various configurations on the first and second recording layers 4, 6. For example, the audio data corresponding to the accompaniment music separated from the complete musical number composed of the lyric and the accompaniment music may be recorded as partial audio data on the first recording layer 4, with the audio data corresponding to the lyric being also recorded on the second recording layer 6 as partial audio data.

In the case of a musical number, such as orchestra performed by plural sorts of musical instruments, audio data portions corresponding to the audio data performed by a piano of the orchestra may be recorded as partial audio data. On the other hand, the first recording layer 4, with the entire audio data comprised of the complete orchestra, being then recorded on the second recording layer 6 as partial audio data.

The respective audio data, recorded as respective partial audio data portions of the complete musical number, on the first and second recording layers 4, 6, are recorded as lyric or its accompaniment music, the audio data as self-contained pieces of the musical number, each forming a musical number set, so that, even if only one of the first and second recording layers 4, 6 is reproduced, self-contained audio data, as a portion of the musical number, is reproduced.

The audio data, recorded on the first and second recording layers 4, 6, are generated by sampling at a sampling frequency of 44.1 kHz followed by 16-bit quantization of analog audio signals supplied from a signal source for recording on the respective recording layers.

The audio data, recorded on the first and second recording layers 4, 6, are recorded thereon to be reproduced by a disc reproducing device employing an light beam having a wavelength of approximately 780 nm.

On one or both of the first and second recording layers 4, 6 of the optical disc 1 are recorded discrimination data for discriminating the combination of the partial audio data recorded on the first and/or second recording layers 4, 6. If audio data corresponding to the accompaniment music, separated from the complete musical number composed of the lyric and the accompaniment music for this lyric, is recorded as partial audio data, the discrimination data is data indicating the addition of the partial audio data recorded on the first and second recording layers 4, 6, whereas, if the entire music composed of the lyric and the accompaniment music for this lyric is recorded on the first recording layer 4 as partial audio data and the audio data corresponding to the lyric is recorded as partial audio data, the discrimination data is data indicating the subtraction the partial audio data recorded on the second recording layer 6 from the partial audio data recorded on the first recording layer 4. This discrimination data is recorded on e.g., a recording area, carrying e.g., management or archival data, of one of the first and second recording layers 4, 6 which is read out first next to the loading of the optical disc 1 on the reproducing apparatus.

A recording apparatus for recording audio data on the optical disc 1, on which there are recorded different portions separated from a complete musical number, as respective audio data portions, or audio data corresponding to the entire musical number and a potion of the musical number, as respective audio data portions, and a reproducing apparatus for reproducing the optical disc recorded by this recording apparatus, are hereinafter explained.

First, a recording apparatus 12 for recording audio data on the optical disc 1, according to the present invention, is explained.

Figure 2:
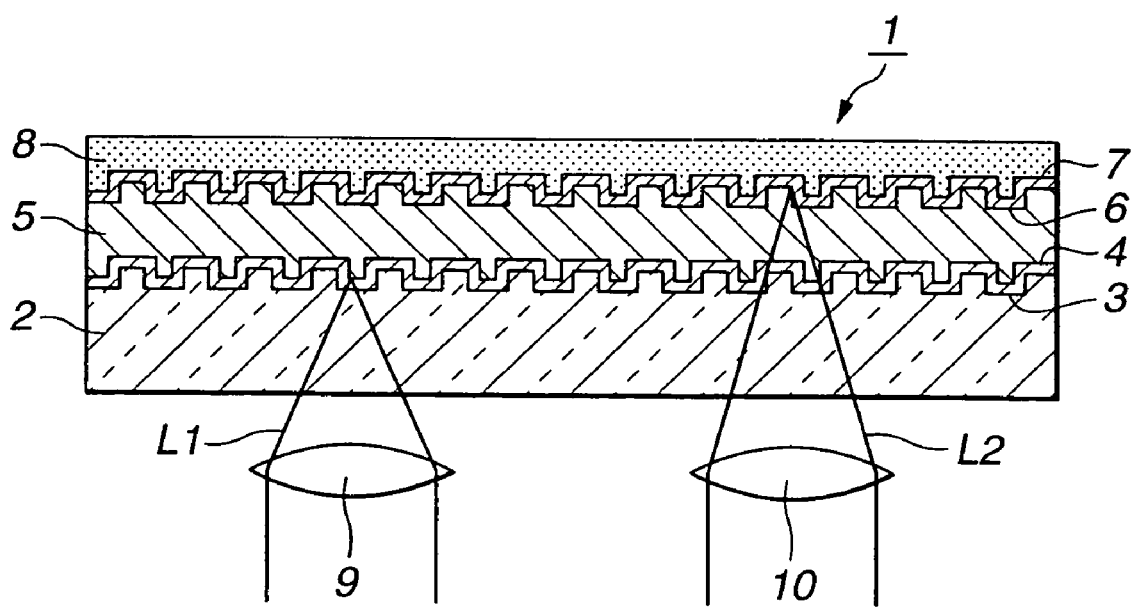
FIG. 2 illustrates two optical pickups adapted for recording audio signals on first and second recording layers of an optical disc.

Referring to FIG. 2, the recording apparatus 12 of the present invention includes two optical pickups, having a first objective lens 9 and a second objective lens 10. A recording light beam $L_1$, converged by the first objective lens 9, is focussed on the first recording layer, and a recording light beam $L_2$, converged by the second objective lens 10, is focussed on the second recording layer 6 for recording audio data on the first and second recording layers 4, 6.

Figure 3:
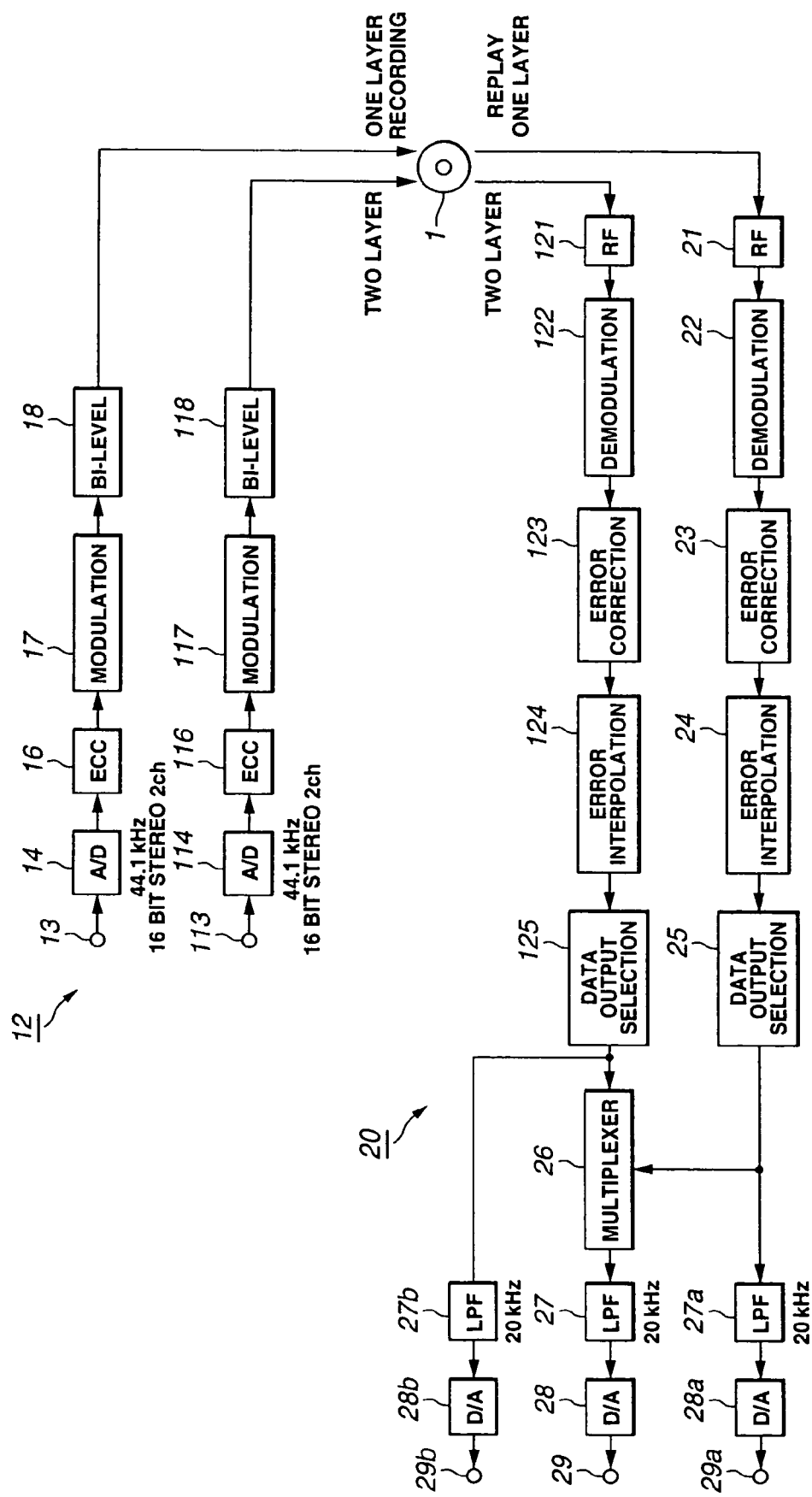
FIG. 3 is a block diagram showing an embodiment of a recording apparatus and an embodiment of a reproducing apparatus according to the present invention.

Referring to FIG. 3, the recording apparatus 12 according to the present invention includes a first input terminal 13, fed with audio signals, recorded on the first recording layer 4, and a second input terminal 113, fed with audio signals recorded on the second recording layer 6.

In the complete musical number composed of the lyric and the accompaniment music for this lyric, signals for the accompaniment music are separated and audio signals corresponding to this accompaniment music are fed as partial audio data to the first input terminal 13. On the other hand, signals corresponding to the lyric of the musical number are separated so that audio signals corresponding to this lyric are fed to the second input terminal 113. That is, in the recording apparatus 12 according to the present invention, the signals corresponding to the lyric and the signals corresponding to the accompaniment music are separated from the complete musical number, made up of the lyric and the accompaniment music, from a reproducing apparatus, not shown, operating as a sound source for reproducing e.g., a master tape having recorded thereon the original sound. The audio signals of the lyric and those of the accompaniment music, thus separated, are fed to the first and second input terminals 13, 113, respectively. Alternatively, the audio signals produced on reproducing a master tape, having separately or independently recorded thereon the lyric and the accompaniment music, making up a complete musical number, are input to the first and second input terminals 13, 113, respectively.

Meanwhile, the audio signals input to the first and second input terminals 13, 113 are left channel audio data and right channel audio data in order to permit stereophonic reproduction.

The analog audio data, input to the first and second input terminals 13, 113, and which correspond to the lyric portion and to the accompaniment music portion, respectively, are routed to first and second A/D converters 14, 114 where the signals are sampled at the sampling frequency of 44.1 kHz accepted by these A/D converters 14, 114, and quantized in 16 bit stereophonic two-channel audio signals, to be output from the A/D converters 14, 114.

The digital audio signals, output from the first D/A converter 14, are sequentially routed to a first error correction coding circuit 16, a first modulation circuit 17 and a first bi-level circuit 18, making up a signal processing system responsible for recording on the first recording layer 4.

Similarly, the digital audio signals, output from the A/D converter 114, are sequentially routed to a second error correction coding circuit 116, a second modulation circuit 117 and a second bi-level circuit 118, making up a signal processing system responsible for recording on the second recording layer 6.

The first and second error correction coding circuits 16, 116 encode samples with the combination of the cross-interleaving and four-order Reed-Solomon code, using an algorithm of the cross interleave Reed-Solomon code (CIRC). The first and second modulation circuits 17, 117 modulate encoded outputs of the first and second error correction coding circuits 16, 116 in accordance with the algorithm of EFM (eight to fourteen modulation). The first and second bi-level circuits 18, 118 convert modulated outputs of the first and second modulation circuits 17, 117 into bi-level data for recording on the first and second recording layers 4, 6 of the optical disc 1, respectively.

The data fed from the first input terminal 13 and converted into bi-level data by the above-described signal processing system, that is recording data output by the bi-level circuit 18, are recorded by the first optical pickup having the first objective lens 9 shown in FIG. 2 on the first recording layer 4. The recording data fed from the second input terminal 113 and converted by the above-described signal processing system into bi-level data, that is recording data output by the bi-level circuit 118, are recorded on the second recording layer 6 by the second optical pickup having the second objective lens 10 shown in FIG. 2.

A reproducing apparatus for reproducing the optical disc 1, having recorded in its first recording layer 4 signals of a lyric portion of a complete musical number composed of the lyric portion and the accompaniment music for the lyric portion, and also having recorded in its second recording layer 6 signals of the accompaniment music portion, is now explained.

Referring to FIG. 2, this reproducing apparatus 20 includes two optical pickups, one of which has the first objective lens 9 and the other of which has the second objective lens 10. The recording light beam, converged by the first objective lens 9, is focussed on the first recording layer 4, the recording light beam, converged by the second objective lens 10, is focussed on the second recording layer 6 and the return light beam reflected from the first and second recording layers 4, 6 are detected to reproduce the audio data recorded on the first and second recording layers 4, 6. It is of course possible to use a sole optical pickup and to switch the focussing position of the light beam illuminated from the objective lens on the optical disc 1 from the first recording layer 4 to the second recording layer 6 and vice versa.

In the reproducing apparatus 20, signals read out by the first optical pickup from the first recording layer 4 of the optical disc 1 rotationally driven at e.g., CLV by a rotational driving unit, not shown, are sequentially routed to a first RF circuit 21, a first demodulating circuit 22 and to a second error correction circuit 23, making up a playback signal processing unit. The first RF circuit 21 performs RF processing, such as amplification, on the signals read out from the first optical pickup, to generate RF signals, which are routed to the first demodulating circuit 22. The first demodulating circuit 22 performs EFM demodulation on the RF signals to route the demodulated signals to the first error correction circuit 23. The first error correction circuit 23 corrects the demodulated output data from the first demodulating circuit 22 by CIRC to route the resulting data to a first error interpolation circuit 24. The first error interpolation circuit 24 interpolates the corrected output data from the correction circuit 23.

Similarly to the signals read out by the first optical pickup from the first, recording layer 4, the signals read out by the second optical pickup from the second recording layer 6 of the optical disc 1 are sequentially routed to a second RF circuit 121, a second demodulating circuit 122 and to a second error correction circuit 123. The second RF circuit 121 performs RF processing, such as amplification, on the signals read out from the second optical pickup, to generate RF signals, which are routed to the second demodulating circuit 122. The second demodulating circuit 122 performs EFM demodulation on the RF signals from the second RF circuit 121 to route the demodulated signals to the second error correction circuit 123. The second error correction circuit 123 corrects the demodulated output data from the demodulating circuit 122 by CIRC to route the resulting data to a second error interpolation circuit 124. The second error interpolation circuit 124 interpolates the corrected output data from the correction circuit 123.

Meanwhile, the reproducing apparatus 20 includes a playback mode selection button, not shown. This playback mode selection button selects the playback mode of audio data recorded on the optical disc 1.

On output sides of the first and second error interpolation circuits 24, 124, there are provided first and second data output selection circuits 25, 125 for selecting the outputting of audio data read out from the first and second recording layers 4, 6 by selecting a playback mode selection button, not shown.

If a playback mode selection button, not shown, is acted on by a user, and a playback mode according to-the discrimination data pre-recorded on the optical disc 1, the audio data read out from the first and second recording layers 4, 6 are routed to the multiplexer 26 through the first and second data output selection circuits 25, 125. The multiplexer 26, fed with the audio data read out from the first and second recording layers 4, 6, sums or subtracts the audio data read out from the first recording layer 4 and the audio data read out from the second recording layer 6 to output the resulting data.

For example, if, when audio data corresponding to accompaniment music, separated from the complete musical number comprised of a lyric and the accompaniment music for this lyric, is recorded on the first recording layer 4, as partial audio data, and audio data corresponding to the lyric is recorded as partial audio data in the second recording layer 6, discrimination data is recorded as data indicating summation of audio data read out from the first and second recording layers 4, 6, the multiplexer 26 sums the audio data read out from the first and second recording layers 4, 6 to output the summation data this summation data is audio data of the complete musical number containing audio data corresponding to the accompaniment music recorded on the first recording layer 4 and also containing audio data corresponding to the lyric recorded on the second recording layer 6.

If, when audio data corresponding to the entire complete musical number comprised of a lyric and the accompaniment music for this lyric, is recorded on the first recording layer 4, as partial audio data, and audio data corresponding to the lyric is recorded as partial audio data in the second recording layer 6, discrimination data is recorded as data indicating subtraction of the partial audio data recorded on the second recording layer 6 from the audio data read out from the first recording layer 4, the multiplexer 26 subtracts the audio data read out from the second recording layer 6 from the audio data read out from the first recording layer 4 to output the resulting subtraction data. This summation data is audio data containing only audio data corresponding to the accompaniment music of the lyric.

The audio data, summed or subtracted by the multiplexer 26, is routed to a first low-pass filter (LPF) 27. The first LPF 27 applies filtering to audio data output from a multiplexer 26 with approximately 20 kHz as a cut-off frequency. The audio data, filtered by the first LPF 27, is routed to a first D/A converter 28 for conversion to analog audio signals which are output from the first output terminal 29. By connecting a reproducing apparatus having an electro-acoustic transducer, such as a loudspeaker or a headphone, to the first output terminal 29, there is produced acoustic reproduction by the audio sound corresponding to the sum of the audio data read out from the first recording layer 4 and audio data read out from the second recording layer 6, or acoustic reproduction by the audio sound corresponding to the audio data read out from the first recording layer 4 less the audio data read out from the second recording layer 6.

If a playback mode selection button, not shown, is acted on by the user, such that the playback mode for independently outputting audio data read out from the first and second recording layers 4, 6 of the optical disc 1 is selected, the audio data read out from the first and second recording layers 4, 6 is sent via first and second data output selection circuits 25, 125 to second and third LPFs 27a, 27b. These second and third LPFs 27a, 27b apply filtering, with approximately 20 kHz as a cutoff frequency, to the audio data output by the first and second data output selection circuits 25, 125. The audio data, filtered by the second and third LPFs 27a, 27b, are routed to second and third D/A converters 28a, 28b, for conversion into analog audio signals, which are output from second and third output terminals 29a, 29b, respectively. By connecting a reproducing apparatus, such as a loudspeaker or a headphone, provided with an electro-acoustic transducer, acoustic reproduction takes place by the audio sound based on audio data read out from the first and second recording layers 4, 6. By selecting signals output by the second and third output terminals 29a, 29b, audio data recorded on the first and second recording layers 4, 6 can be selectively reproduced and heard by the user.

By recording plural partial audio data of the complete musical number, or a partial audio data and the entire audio data, in the first and second recording layers 4, 6 provided on the optical disc 1, and by summing or subtracting the audio data read out from the recording layers 4, 6, it is possible to realize diversified acoustic reproduction.

It is noted that, since the audio data are recorded on the first and second recording layers 4, 6 of the optical disc 1 as meaningful audio data from one partial audio data recorded on the recording layer 4 or 6 to another, acoustic reproduction similar to that realized conventionally can be achieved by reproducing audio data recorded only on the recording layer 4 or 6 by a reproducing apparatus provided with a sole optical pickup having a sole objective lens.

Figure 4:
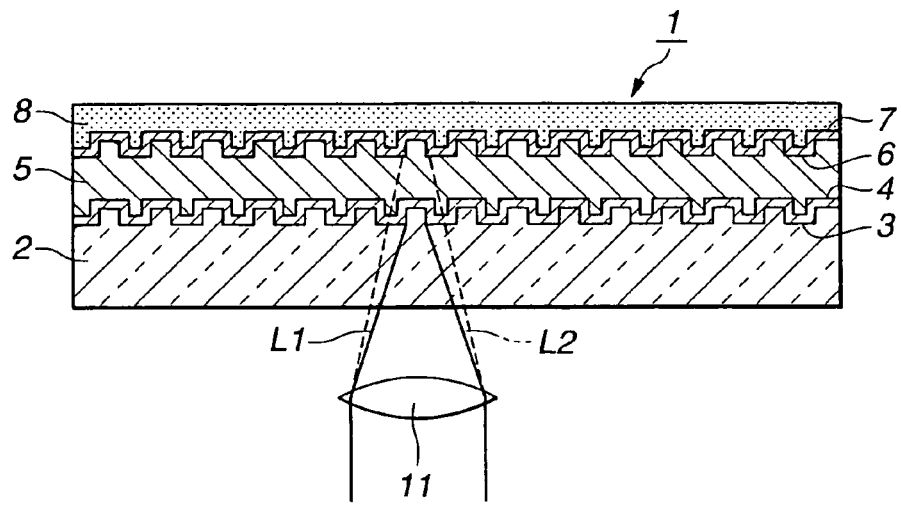
FIG. 4 is a cross-sectional view showing the state of recording audio signals on first and second recording layers of an optical disc according to the present invention and the state of reproducing the recorded audio signals.
Figure 5:
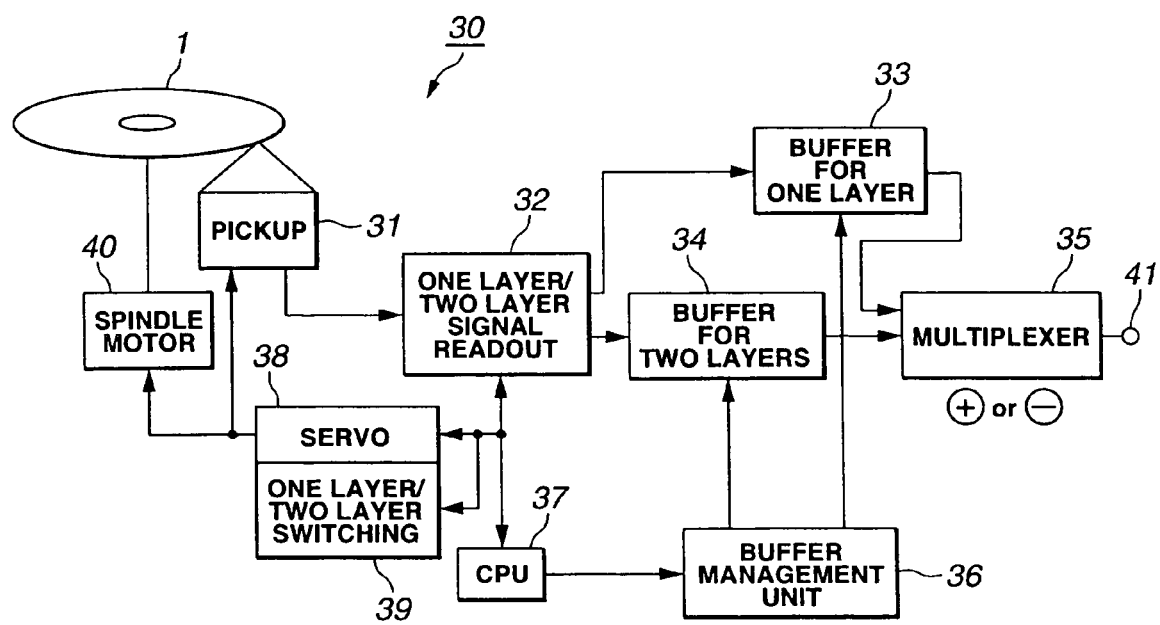
FIG. 5 is a block diagram showing a modification of a reproducing apparatus according to the present invention.

Referring to FIGS. 4 and 5, another embodiment of a reproducing apparatus for reproducing an optical disc 1, having plural partial audio data of a complete musical number or the entire musical number and partial audio data thereof, recorded on the first and second recording layers 4, 6, is explained with reference to FIGS. 4 and 5.

This reproducing apparatus 30 includes a readout mechanism, having an optical pickup 31 and a signal readout unit 32 for reading out audio data recorded on the first and second recording layers 4, 6 of the optical disc 1, a first buffer memory 33 for memorizing playback data corresponding to the audio data recorded on the first recording layer 4 and reproduced with modulation and error correction processing by the signal readout unit 32, and a second buffer memory 34 for memorizing playback data corresponding to the audio data recorded on the second recording layer 6 and reproduced with modulation and error correction processing by the signal readout unit 32. The reproducing apparatus 30 also includes a multiplexer 35 for summing or subtracting outputs read out from the first and second buffer memories 33, 34 and a servo circuit 38 for causing movement of the objective lens of the optical pickup 31 in a direction parallel and/or perpendicular to the optical axis of the objective lens to control the light beam-radiated from the optical pickup 1 to scan the target recording track of the optical disc 1. The servo circuit 38 is also provided with a switching unit 39 for switching the light beam radiated from the optical pickup 31 and converged by the objective lens 11 so that the light beam will be selectively focussed on one of the first and second recording layers 4, 6. The reproducing apparatus 30 also includes a spindle motor 40 for rotationally driving the optical disc 1 at a CLV or CAV under control by the servo circuit 38.

The reproducing apparatus 30 includes a CPU (central processing-unit) 37 for deciding whether the audio data recorded on the first and second recording layers 4, 6 of the optical disc 1 are to be reproduced, the audio data recorded on the first and second recording layers 4, 6 are to be synthesized and reproduced, or a conventional optical disc, such as CD, is to be reproduced, under a command from a user or depending on the configuration of the disc to be loaded, and for controlling the servo circuit 38, switching unit 39, signal readout unit 32 and a buffer management unit 36 depending on the results of decision. To the CPU 37 is connected an operating unit, not shown, provided with a playback mode selection button for the user to select the playback mode of the optical disc 1.

Meanwhile, in the present reproducing apparatus 30, the audio data read out from the first and second recording layers 4, 6 may be stored in different memory storage areas of a common buffer memory 34 without employing the two buffer memories, namely the first and second buffer memories 33, 34.

In the reproducing apparatus 30, the audio data read out from the first and/or second recording layers 4, 6 of the optical disc 1 are routed to the signal readout unit 32. Based on control signals from the servo circuit 38 and the switching unit 39, the optical pickup 31 is controlled to focus a light beam selectively on the first recording layer 4 or on the second recording layer 6 to scan the first or second recording layer 4, 6.

The signal readout unit 32, making up a readout mechanism along with the optical pickup 31, performs pre-set RF processing, such as amplification, or replay signal processing, such as demodulation and error correction processing, on the output signal of the optical pickup 31, that is the signal derived from the audio data read out from the first or second recording layer 4, 6, to route the processed signal to the first buffer memory 33 or the second buffer memory 34.

The first buffer memory 33 is a memory for writing or reproducing replay data corresponding to audio data recorded on or read out from the first recording layer 4 or reproducing the replay data, and the second buffer memory 34 is a memory for writing replay data corresponding to audio data recorded on or read out from the second recording layer 6. Data writing or readout on or from the first buffer memory 33 or the second buffer memory 34 is controlled by the buffer management unit 36.

The operation of the reproducing apparatus 30 shown in FIG. 5 is now explained in detail.

If the user acts on the a playback mode selection button, not shown, provided on the reproducing apparatus, and the command is to reproduce only the audio data recorded on the first recording layer 4 of the optical disc 1, the CPU 37 selects reproduction of audio data only from the first recording layer 4, so that the optical pickup 31 is controlled by the servo circuit 38 and the switching unit 39 to focus the light beam on the first recording layer 4 of the optical disc 1, run in rotation by the spindle motor 40, to scan only the first recording layer 4 of the optical disc 1. If the optical pickup 31 is controlled to scan the first recording layer 4, the return light beam reflected back only from the first recording layer 4 is detected by a photo detector of the optical pickup 31, so that an output signal of the optical pickup 31 is sent to the signal readout unit 32 to read out only audio data recorded on the first recording layer 4. The output data derived from the audio data recorded on the first recording layer 4 and which is output by the signal readout unit 32 is subjected to pre-set replay processing, such as demodulation and error correction, so as to be written in the first buffer memory 33 at a pre-set timing under control by the buffer management unit 36. The data then is read out from the first buffer memory 33 so as to be output from an output terminal 41 via a multiplexer 35.

The audio data, read out from the first recording layer 4, is converted by an error interpolation unit 25, an LPF 26 and a D/A converter 27, similar to those used in the respective apparatus 20 shown in FIG. 3, so as to be output at the output terminal 41.

If a replay mode selection button, not shown, provided on the reproducing apparatus 30, is acted on by the user, such that the replay mode of reproducing only audio data recorded on the second recording layer 6 of the optical disc 1 is selected, the processing similar to that when the replay mode of reproducing only the first recording layer 4 occurs to read out the audio data recorded on the second recording layer 6. The audio data so read out are converted into analog audio signals which are output at the output terminal 41.

If a replay mode selection button, not shown, provided on the reproducing apparatus 30, is acted on by the user, so that the replay mode of multiplexing and reproducing audio data recorded on the first and second recording layers 4, 6 of the optical disc 1 is selected, the audio data is reproduced by the following sequence of operations: That is, if the replay mode for multiplexing reproduction is selected, the CPU 37 decides to multiplex and reproduce the audio data read out from the first and second recording layers 4, 6 of the optical disc 1. If the replay mode of multiplexing and reproducing the audio data is decided, the optical pickup 31 is switchingly controlled, by the servo circuit 38 and the switching unit 39, to focus the replay light beam on one of the first and second recording layers 4, 6. The focussing point switching timing to the first or second recording layer 4, 6 is selected so that, in reproducing audio data recorded on the second recording layer 6 after reproducing audio data recorded on the first recording layer 4, the second recording layer 6 commences to be reproduced at a time point previous to the replay end time point of the audio data of the first recording layer 4 on the time axis, and so that reproduction is continued up to a time point posterior to the reproduction end time point of audio data on the first recording layer 4, with the reproduction being then shifted to a focussed position of the light beam on the first recording layer 4. That is, referring to FIG. 6A, if reproduction is made from a point $P_{11}$ on the first recording layer 4 up to a point $P_{12}$ on the first recording layer 4 and subsequently the reproduction is to be shifted to the second recording layer 6, the focussing point of the light beam reverts to a point temporally previous to the replay end time point $P_{12}$ on the first recording layer 4 to initiate the reproduction of the second recording layer 6 as from the time point $P_{21}$, the second recording layer 6 is reproduced as from the replay end time point $P_{12}$ on the first recording layer 4 up to a temporally posterior point $P_{22}$, and reproduction is initiated with the focussing point of the light beam on the point $P_{12}$ on the first recording layer 4. Reproduction as from the point $P_{12}$ on the first recording layer 4 continues up to a point $P_{13}$ temporally posterior to the replay end time point $P_{22}$ on the second recording layer 6. If reproduction is to be transferred to the second recording layer 6, the focussing point of the light beam is caused to revert to the replay end time point $P_{22}$ of the second recording layer 6 so that the second recording layer 6 is reproduced up to a time point $P_{23}$ temporally posterior to the replay end point $P_{13}$ of the first recording layer 4. Meanwhile, the focussing point of the light beam is switched by moving the light beam focussing point along the optical axis of the objective lens 11 of the optical pickup 31, that is along the focussing direction.

Figure 6A:
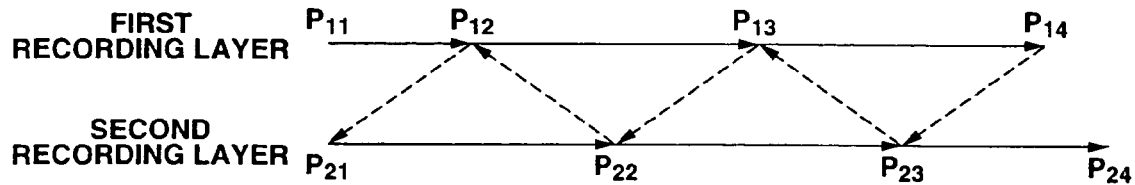
FIGS. 6A to FIG. 6C show switching timing in reproducing the audio signals recorded on plural recording layers on the optical disc by a reproducing apparatus shown in FIG. 5.

The audio data read out at the replay timing shown in FIG. 6A from the first and second recording layers 4, 6 at the replay timing shown in FIG. 6A are routed to the signal readout unit 32 so as to be reproduced in accordance with the above-mentioned timing as described above. In outputting readout signals read out from the first or second recording layers 4, 6, the signal readout unit 32 outputs to the CPU 37 discrimination data indicating whether the data pre-recorded on the first and second recording layers 4, 6 and read out therefrom is to be summed or subtracted. The CPU 37 controls the write or readout timing to or from the first and second buffer memories 33, 34 via buffer management unit 36.

The data write timing to the first or second buffer memories 33, 34 is analogous to the replay timing shown in FIG. 6A or readout timing in the signal readout unit 32. On the other hand, data readout timing from the first or second buffer memories 33, 34 is set so that data readout will be initiated after storage of a pre-set quantity of data written in the first and second buffer memories 33, 34. Theoretically, data is read out from the optical disc 1 at a high readout speed not less than twice the prescribed standard readout speed and written at the aforementioned timing in the first and second buffer memories 33, 34. The audio data recorded on the first or second recording layers 4, 6 are read out and reproduced. After a pre-set amount of data has been written in the first or second buffer memories 33, 34, output data corresponding to the audio data recorded on the second or first recording layers 6, 4 is read out from the first buffer memory 33 or from the second buffer memory 34 so as to be multiplexed by the multiplexer 35. For non-interrupted reproduction from the first or second recording layer 4, 6, at least the double speed is required, as described above, if the switching time in switching the replay timing of the first and second recording layers 4, 6, is also taken into account. In actuality, the spindle motor 40 is run in rotation at a speed not less than the quadrupled speed so that the optical pickup 31 will read out the data recorded on the optical disc at high read-out rate.

Figure 6B:
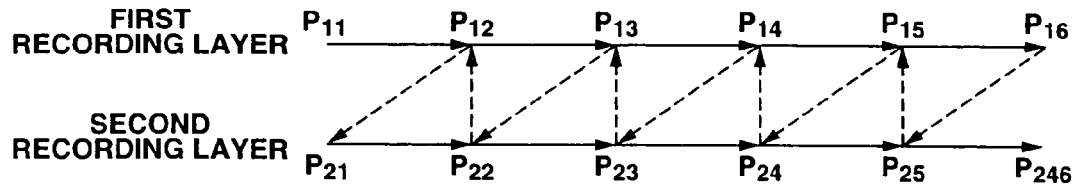

The changeover timing in illuminating the first or second recording layers 4, 6 as the focussing position of the playback light beam radiated from the optical pickup 31 is switched between the recording layers 4 and 6 may be such a timing as is shown in FIG. 6B. The first recording layer 4 is reproduced as from the time point $P_{11}$ up to the time point $P_{12}$ in the first recording layer 4. When reproduction is to be shifted to the second recording layer 6, the second recording layer 6 commences to be reproduced as the scanning point by the light beam reverts to the time point $P_{21}$ temporally previous to the replay end point $P_{12}$ of the first recording layer 4 up to the point $P_{22}$ of the same timing as the replay end point $P_{12}$ of the first recording layer 4. The light beam focussing position then is shifted to the first recording layer 4 to initiate the reproduction of the first recording layer 4 as from the point $P_{12}$ of the first recording layer 4. The reproduction as from the point $P_{12}$ of the first recording layer 4 continues to a point $P_{13}$ temporally posterior to the replay end point $P_{22}$ of the second recording layer 6. When reproduction is to be shifted to the second recording layer 6, the light beam scanning position is caused to revert to the replay end point $P_{22}$ on the second recording layer 6 to reproduce the second recording layer 6 up to the point $P_{23}$ of the same timing as the replay end point $P_{13}$ of the first recording layer 4.

The signal read out from the first and second recording layers 4, 6 in the reproduction timing shown in FIG. 6B is routed to the signal readout unit 32 so that the replay signal processing is carried out in accordance with the above-mentioned timing as described above.

Figure 6C:
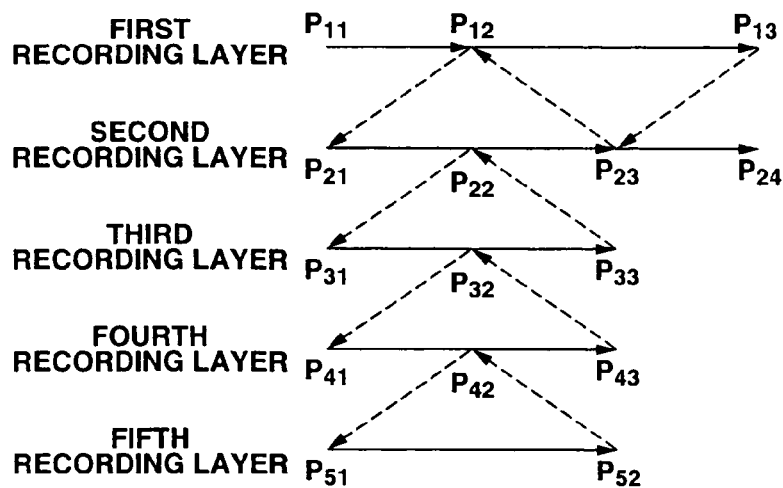

FIG. 6C shows the changeover timing of a five-layered optical disc, having five recording layers, as a recording medium, as another embodiment of an optical disc having plural recording layers. Specifically, FIG. 6C shows the changeover timing in sequentially switching from one recording layer to another, using a sole optical pickup, in reproducing the audio data recorded in each recording layer of the optical disc.

In switching the focussing position of the replay light beam, radiated from the optical pickup, from the first recording layer to the second recording layer, from the second recording layer to the third recording layer, from the third recording layer to the fourth recording layer and from the fourth recording layer to the fifth recording layer, reproduction reverts to points temporally previous to the replay end time points $P_{12}$, $P_{22}$, $P_{32}$ and $P_{42}$ of the previously reproduced layer, respectively. As for the replay timing of the second, third and fourth recording layers, these layers are reproduced up to the points $P_{22}$, $P_{32}$ and $P_{42}$ of the same timing as the replay end points $p_{12}$, $P_{22}$, $P_{32}$ of the temporally previous recording layer. However, the replay timing of the fifth recording layer is such that the fifth recording layer is reproduced up to a replay end time point $P_{52}$ which is temporally posterior to the replay end time point $P_{42}$ of the fourth recording layer.

In the reproduction apparatus 30, shown in FIG. 5, it is possible to realize variegated reproduction, such as reproduction of data synthesized from data of a lyric and data of the accompaniment music for the lyric, making up with the lyric the complete musical number recorded on the first or second recording layers 4, 6 of the optical disc 1, or reproduction of data corresponding to the entire musical number recorded on one of the first and second recording layers 4, 6 less data of the lyric or the accompaniment music of the lyric of the musical number recorded on the other recording layer. In the first and second recording layers 4, 6, data of the lyric and data of the accompaniment music of a complete musical number are recorded, so that audible musical number reproduction is possible irrespective of on which recording layer the audio data reproduced have been recorded.

An embodiment of the recording apparatus for recording audio signals on the first or second recording layers 4, 6 of the optical disc 1 at a pre-stage to the sampling stage by an LPF is hereinafter explained.

Figure 7:
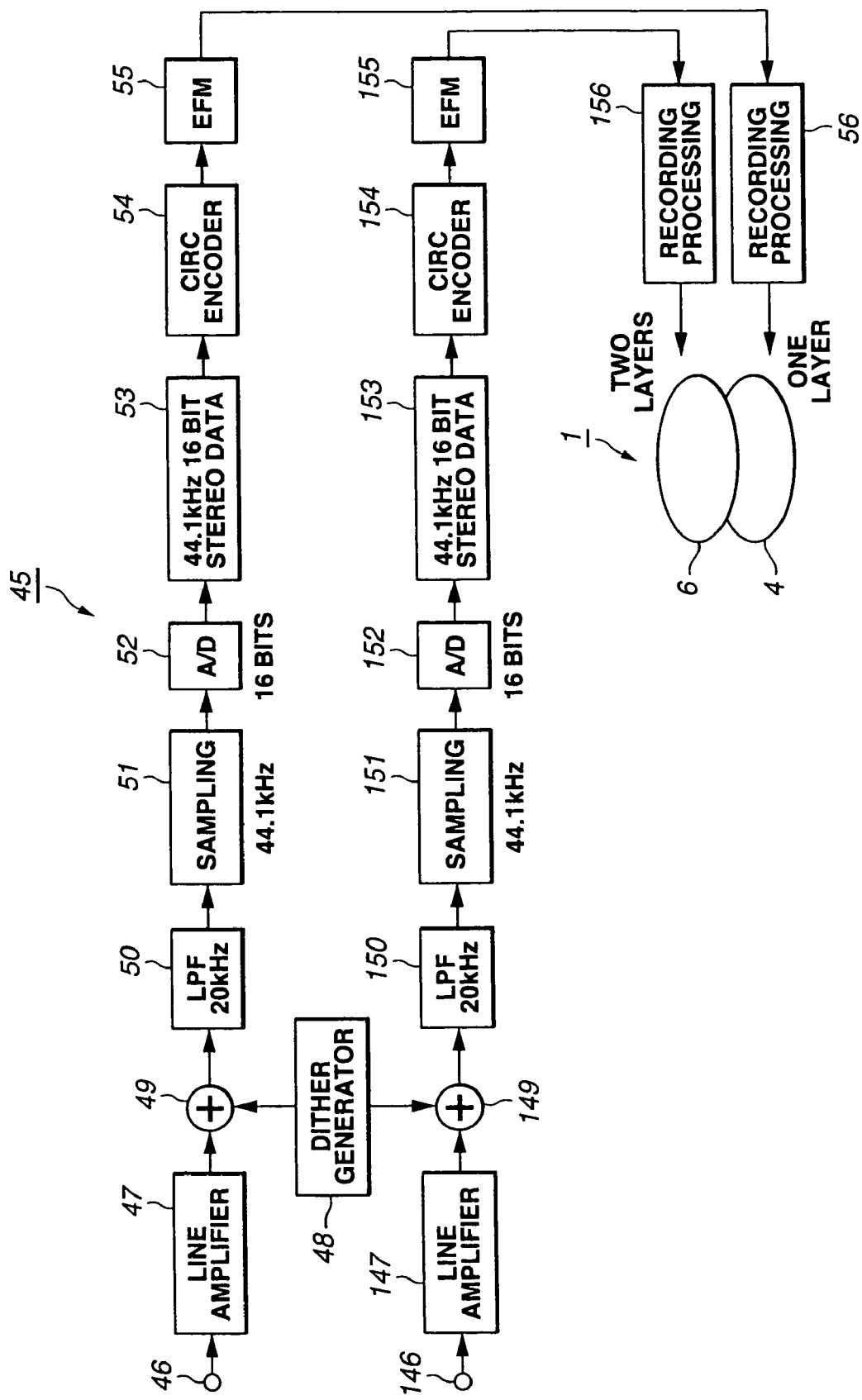
FIG. 7 is a block diagram showing a modification of a recording apparatus according to the present invention.

Referring to FIG. 7, the recording apparatus 45 includes a first input terminal 46, fed with audio signals recorded on the first recording layer 4 of the optical disc 1, and a second input terminal 146, fed with the audio signals recorded on the second recording layer 6.

It is noted that the first input terminal 46 is fed from a sound source, not shown, with entire audio signals of a complete musical number comprised of a lyric and the accompaniment music for the lyric, as partial audio data, and, the second input terminal 146 is fed with a sound source, not shown, with audio signals of an accompaniment music portion of the complete musical number containing the lyric portion and the accompaniment music of the lyric portion.

Alternatively, the first input terminal 46 may be fed from a sound source, not shown, with entire audio signals of a complete musical number comprised of a lyric and the accompaniment music for the lyric, as partial audio data, and a second input terminal 146 is fed with a sound source, not shown, with audio signals of lyric portion of the complete musical number containing the lyric portion and the accompaniment music of the lyric portion.

Still alternatively, the first input terminal 46 may be fed from a sound source, not shown, with audio signals of an accompaniment music for a lyric of a complete musical number comprised of the lyric and the accompaniment music for the lyric, as partial audio data, and the second input terminal 146 may be fed with audio signals of lyric portion of the complete musical number containing the lyric portion and the accompaniment music of the lyric portion, as partial audio data.

It is noted that the audio signals fed to the first and second input terminals 46, 146 are stereo audio signals of two channels, namely left and right channels, enabling the stereophonic reproduction.

The audio signals, fed to the first and second input terminals 46, 146, are processed with sampling with the sampling frequency of 44.1 kHz and 16-bit quantization, for each of the left and right channels, for recording on the first and second recording layers 4, 6.

The first audio signals, input to the first input terminal 46, are amplified by a first line amplifier 47, and then supplied to a first adder 49 adapted for adding dithering to the signals. The dithering is a random noise of small amplitude supplied from a dither generator 48. From the first audio signal, added to with the dithering by the first adder 49, signal components of a frequency range not higher than 20 kHz are taken out by a first low-pass filter (LPF) 50 and thence routed to a first sampling circuit 51. This first sampling circuit 51 applies sampling at a sampling frequency of 44.1 kHz to a filtered output of the first LPF 50. This sampling data is converted into 16-bit digital signals by a first A/D converter 52.

The second audio signals, input to the second input terminal 146, are amplified by a second line amplifier 147, and thence supplied to a second adder 149 adapted for adding dithering to the signals. The dithering is a random noise of small amplitude supplied from the dither generator 48. From the second audio signal, added to with the dithering by the second adder 149, signal components of a frequency range not higher than 20 kHz are taken out by a second low-pass filter (LPF) 50 and thence routed to a second sampling circuit 151. This second sampling circuit 151 applies-sampling at a sampling frequency of 44.1 kHz to a filtered output of the second LPF 150. This sampling data is converted into 16-bit digital signals by a second A/D converter 152.

The first digital audio signals, derived from the first audio signals output from the first A/D converter 52, are stored in a first buffer memory 53. The first digital audio signals, read out from the first buffer memory 53, are routed to a first error correction coding circuit 54 so as to be processed with cross interleaving employing the CIRC algorithm combined with four-order Reed Solomon code. The encoded data output from the first error correction coding circuit 54 is EFM-modulated by a first modulation circuit 55 so as to be processed for recording on a first recording circuit 56 and so as to be recorded on the first recording layer 4 of the optical disc 1 by one of two optical pickups shown in FIG. 2.

On the other hand, the second digital audio signals, derived from the second audio signals, output from a second A/D converter 152, are stored in a second buffer memory 153. The second digital audio signals, read out from the second buffer memory 153, are routed to a second error correction coding circuit 154 so as to be encoded by the cross interleaving employing the CIRC algorithm combined with four-order Reed Solomon code. The encoded data output from the second error correction coding circuit 154 is EFM-modulated by a second modulation circuit 155 so as to be processed for recording on a second recording circuit 156 and so as to be recorded on the second recording layer 6 of the optical disc 1 by the other optical pickup shown in FIG. 2.

In the optical disc 1 of each of the above-described embodiments, plural recording layers are provided in superposition and the entire musical number or a portion thereof is recorded in each recording layer as partial audio data. It is however possible to split the major surface of an optical disc 60 into two or more plane portions on which to record the entire musical number or its partial portion.

Figure 8:
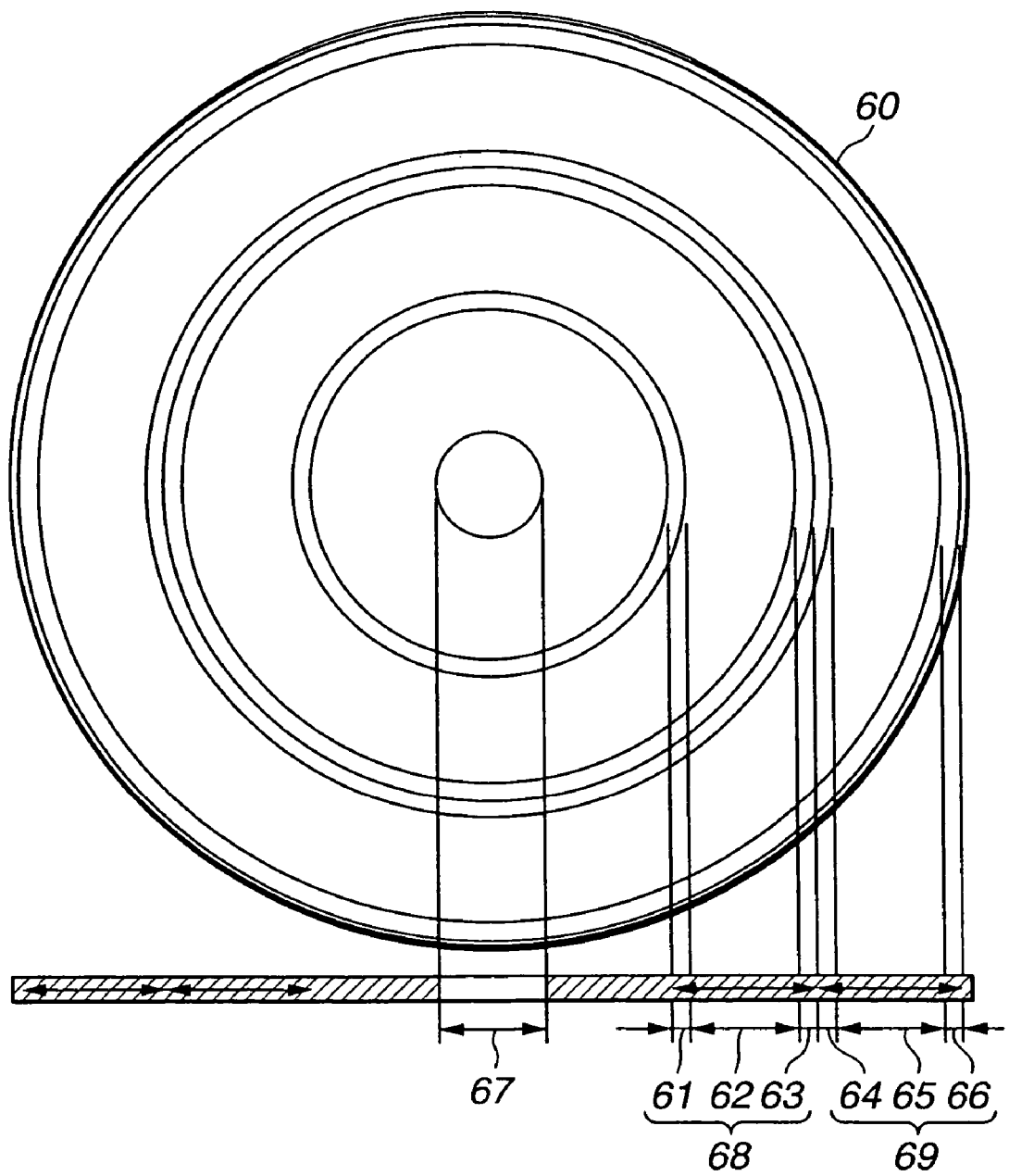
FIG. 8 shows a modification of an optical disc according to the present invention.

In an inner peripheral portion of the optical disc 60 shown in FIG. 8, there is provided a first recording region 62, on an outer peripheral side of which there is recorded a second recording region 65.

In the first recording region 62, the entire audio signals of a complete musical number comprised of the lyric and the accompaniment music are recorded as partial audio signals. In the second recording region 65, the audio signals of the accompaniment music of the complete musical number comprised of the lyric and the accompaniment music are similarly recorded as partial audio signals.

Alternatively, the audio signals of the accompaniment music of a complete musical number comprised of the lyric and the accompaniment music may be recorded as partial audio signals, and the audio signals of the lyric of a complete musical number comprised of the lyric and the accompaniment music may be recorded as partial audio signals.

The first and second audio signals, recorded on the first and second recording regions 62, 65, are converted into digital audio signals from sampling data generated on sampling with the sampling frequency of 44.1 kHz followed by 16-bit quantization, so as to be processed with error correction processing and EFM modulation as in the above-described embodiment for recording in the respective recording regions 62, 65, as in the embodiment described above.

Adjacent to the inner rim of the first recording region 62, there is provided a first management area 61 for supervising the audio data recorded on the first recording region 62. Adjacent to the inner rim side of the second recording region 65 and to the outer rim side of the first recording region, there is provided a second management area 64 for supervising the audio data recorded in the second recording region 65. In the first management area 61, there are recorded first discrimination data for indicating the presence of the second recording region 65 and second discrimination data indicating whether the data recorded in the first recording region 62 and data recorded in the second recording region 65 are to be multiplexed and reproduced.

The optical disc 60 has a center opening 67. The first management area 61, the first recording region 62 and a first read-out area associated with these regions 61, 62 form a first session 68, and the second management area 64, the second recording region 65 and a second read-out area associated with these regions 64, 65 form a second session 69.

The audio data recorded on these recording regions 62, 65 are recorded such as to be reproduced by a routine reproducing apparatus for a compact disc employing a light beam of 780 nm. The accompaniment music portion or the lyric portion of a complete musical number, comprised of the accompaniment music portion and the lyric portion, are recorded as a set, as in the case of the above-described optical disc 1, so that, if the audio data recorded in the recording regions 62, 65 are reproduced independently of each other, the audio data so reproduced can be heard as the music number.

The recording medium according to the present invention may be an optical card or a semiconductor memory, in addition to an optical disc.

INDUSTRIAL APPLICABILITY

If a recording medium according to the present invention is reproduced, a musical number composed of the lyric and the accompaniment music or the orchestra performed by plural sorts of musical instruments can be reproduced as a set of audio signals. Moreover, only the accompaniment music portion of a musical number composed of the lyric and the accompaniment music, or the performance by only certain musical instrument(s) of the orchestras, may be reproduced, so that the user is able to selectively hear a desired one of variegated audio reproduction.

The invention claimed is:

1. A recording apparatus for recording audio signals on a recording medium, said recording medium having a plurality of recording regions overlying one another, comprising:
sampling means for sampling signals separated into a plurality of partial portions from audio signals from a sound source at a predefined sampling frequency, said plurality of partial portions including said audio signals in their entirety; and
recording means for recording first digital data obtained from said sampling means in a first recording region of said recording medium and for recording second digital data obtained from said sampling means in a second recording region of said recording medium.

2. The recording apparatus according to claim 1, wherein said predefined sampling frequency is 44.1 kHz.

3. The recording apparatus according to claim 1, wherein said audio signals are reproducible by a disc reproducing apparatus employing a light beam having a wavelength of approximately 780 nm.

4. The recording apparatus according to claim 1, wherein said recording medium is a disc shaped recording medium having first and second recording layers within which said sampling data is separated into two said partial portions that are recorded.

5. The recording apparatus according to claim 1, wherein said plurality of partial portions are independent partial portions.

6. The recording apparatus according to claim 1, wherein said plurality of partial portions represent accompaniment music of a lyric.

7. A recording method for recording audio signals on a recording medium, said recording medium having a plurality of recording regions overlying one another, said method comprising the steps of:
sampling signals separated into a plurality of partial portions from audio signals from a sound source at a predefined sampling frequency, said plurality of partial portions including said audio signals in their entirety; and
recording first digital data obtained from said sampling means in a first recording region of said recording medium and recording second digital data obtained from said sampling means in a second recording region of said recording medium.

8. The recording apparatus according to claim 1, wherein said recording apparatus includes a first processing circuit line for processing first audio signals, and a second processing circuit line for processing second audio signals.

9. The recording apparatus according to claim 8, wherein said first processing circuit line includes a first modulator, and said second processing circuit line includes a second modulator.

10. The recording apparatus according to claim 8, wherein said first processing circuit line includes a first input terminal, and said second processing circuit line includes a second input terminal.

11. The recording apparatus according to claim 8, wherein said first processing line includes first sampling means of said sampling means, and said second processing circuit line includes second sampling means of said sampling means.

12. The recording apparatus according to claim 1, wherein said recording medium has a management area, and said recording means records first discrimination data for indicating the presence of said second recording region, and second discrimination data indicating whether data recorded in the first recording region and data recorded in the second recording region are to be multiplexed and reproduced in said management area.

13. The recording apparatus according to claim 1, wherein said first digital data are recorded by a first optical pickup having a first objective lens on said first recording region, and said second digital data are recorded by a second optical pickup having a second objective lens on said second recording region.

* * * * *